UNITED STATES PATENT OFFICE.

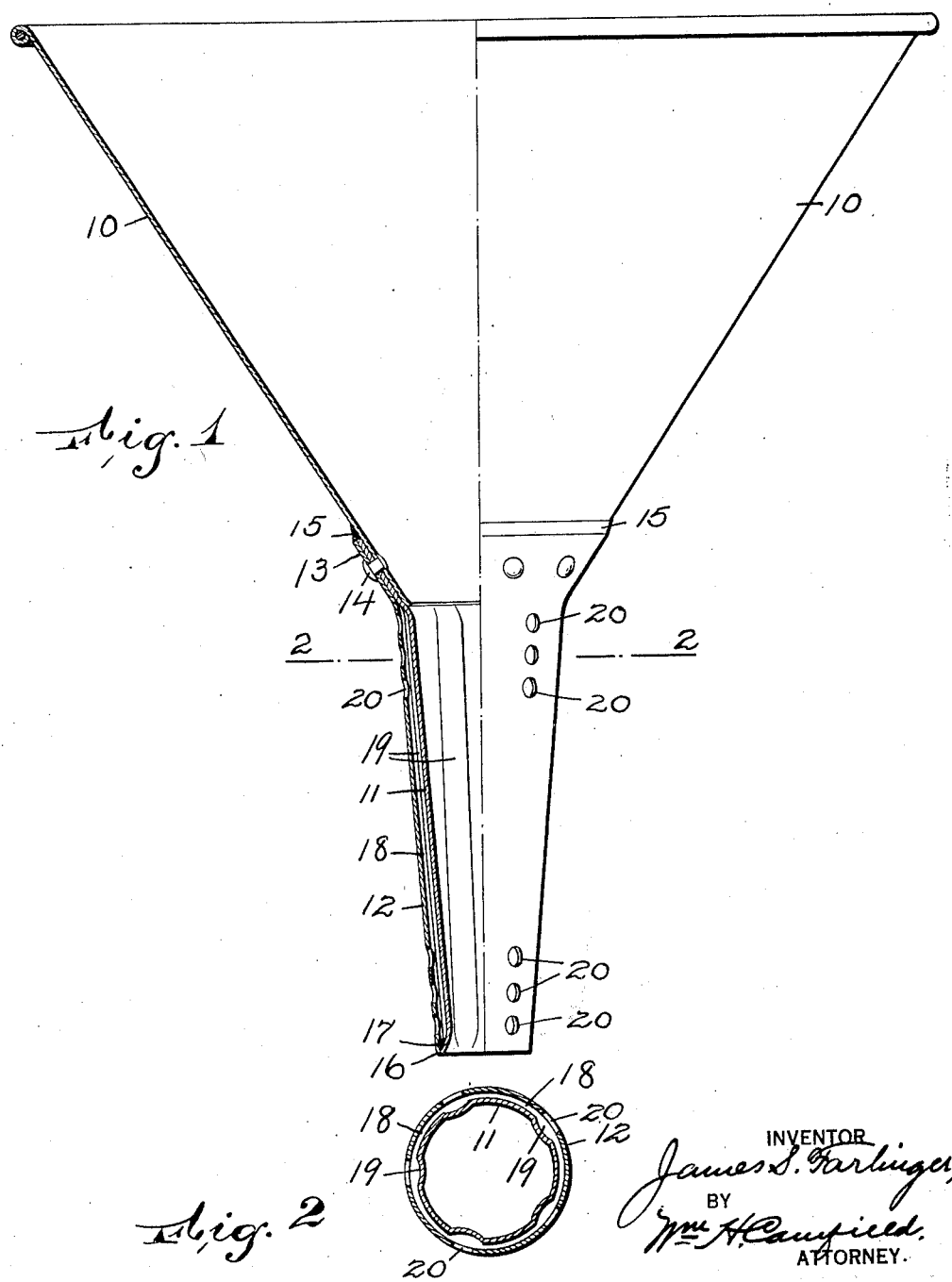

JAMES S. FARLINGER, OF VERONA, NEW JERSEY.

FUNNEL.

1,357,490. Specification of Letters Patent. Patented Nov. 2, 1920.

Application filed July 21, 1920. Serial No. 397,999.

*To all whom it may concern:*

Be it known that I, JAMES S. FARLINGER, a citizen of the United States, and a resident of Verona, county of Essex, and State of New Jersey, have invented certain new and useful Improvements in Funnels, of which the following is a specification.

This invention relates to an improved funnel which is of the type that permits air to escape around the outside of the spout while liquid is being poured into a receptacle through the funnel, such funnels being particularly adaptable for use in garages and oil stations, and prevents the material from being air-locked in the funnel when a steady quantity is being poured into a receptacle through the funnel.

The invention is designed to provide a funnel of this kind which is adapted to withstand the heavy use to which these funnels are usually subjected, so that the end of the spout is protected against indentation or other mutilation, which mutilations would reduce the capacity of the funnel, and also a funnel in which any indentations made in the side of the spout, or rather in the sleeve surrounding the spout, will not close the channels through which the air passes from the receptacle to the outside atmosphere when being displaced by liquid.

The invention is illustrated in the accompanying drawing, in which Figure 1 is a view, one-half of which is in section and the other half in elevation, showing my improved form of funnel, and Fig. 2 is a horizontal section on line 2—2 in Fig. 1.

The funnel has the usual cup 10 which tapers toward the bottom and is connected to the spout 11, which spout is surrounded by a shell 12 which is spaced from the spout, the parts being secured together in any convenient way, but in the form shown the upper ends of the spout and the shell overlap the bottom of the cup, as shown at 13, and are connected by suitable means, such as rivets 14 and are usually made tight by a joint of solder 15.

The funnels as used in garages are of comparatively large size and are consequently heavy, and when carelessly used the lower end of the spout, in the old style funnel, soon becomes misshapen and indented, due to a lack of care in inserting it in the inlet pipe of a tank. To guard against this I make the spout 11 and the shell 12 substantially flush and join their bottom ends, as at 16, these ends being connected by brazing, welding or other means, and I show, in the drawing, a backing of solder 17. This reinforced and stiffened end is calculated to withstand longitudinal blows and also radial pressure.

To prevent the possibility of the air space 18 between the spout and the shell being choked so as to shut off the passage of air between them, I provide the spout with longitudinal grooves 19 made by pressing the material of the spout inward along longitudinal lines, and I provide the shell with perforations 20 disposed near the top and bottom ends of the shell and in line with the grooves 19, so that even should the shell be pressed inward all around against the spout, air can pass through the openings 20 and then from one end of the spout to the other on the outside thereof through the channels established by the grooves 19.

It will be evident that minor changes can be made in the construction without departing from the invention.

I claim:

1. A funnel comprising a cup, a spout, a shell surrounding the spout and spaced therefrom, the bottom of the spout and the bottom of the shell being substantially flush and secured together to form a reinforced end, the shell being secured at its upper end to the funnel proper, the shell having perforations near its upper and lower ends.

2. A funnel comprising a cup, a spout, a shell surrounding the spout and spaced therefrom, the bottom of the spout and the bottom of the shell being substantially flush and secured together to form a reinforced end, the top end of the shell being secured to the funnel proper, the spout having longitudinal grooves on its outer face and extending substantially the full length thereof, the shell having perforations near its upper and lower ends and opposite the ends of said grooves.

In testimony that I claim the foregoing, I have hereto set my hand, this 20th day of July, 1920.

JAMES S. FARLINGER.